(12) United States Patent
Cho et al.

(10) Patent No.: US 12,502,374 B2
(45) Date of Patent: Dec. 23, 2025

(54) COMPOSITION FOR PREVENTING, ALLEVIATING, OR TREATING INFLAMMATORY DISEASE CONTAINING ISOOKANIN OR SALT THEREOF AS ACTIVE INGREDIENT

(71) Applicant: BioSpectrum, Inc., Yongin-si (KR)

(72) Inventors: Eun Ae Cho, Seoul (KR); Kyung Baeg Roh, Hwaseong-si (KR); Eun Sun Jung, Suwon-si (KR); Deok Hoon Park, Seongnam-si (KR)

(73) Assignee: BIOSPECTRUM, INC., Yongin-si (KR)

( * ) Notice: Subject to any disclaimer, the term of this patent is extended or adjusted under 35 U.S.C. 154(b) by 449 days.

(21) Appl. No.: 18/020,120

(22) PCT Filed: Apr. 5, 2021

(86) PCT No.: PCT/KR2021/004213
§ 371 (c)(1),
(2) Date: Feb. 7, 2023

(87) PCT Pub. No.: WO2022/039345
PCT Pub. Date: Feb. 24, 2022

(65) Prior Publication Data
US 2023/0263767 A1    Aug. 24, 2023

(30) Foreign Application Priority Data
Aug. 18, 2020    (KR) .................. 10-2020-0103064

(51) Int. Cl.
*A61K 31/352*    (2006.01)
*A23L 33/00*    (2016.01)
(Continued)

(52) U.S. Cl.
CPC ............ *A61K 31/352* (2013.01); *A23L 33/10* (2016.08); *A23L 33/40* (2016.08); *A61P 29/00* (2018.01)

(58) Field of Classification Search
CPC .......... A61K 31/352; A61K 8/49; A61K 9/00; A61K 31/353; A61K 8/498; A61K 9/0014;
(Continued)

(56) References Cited

U.S. PATENT DOCUMENTS

| 2004/0038914 A1 | 2/2004 | Krutmann et al. |
| 2020/0359670 A1 | 11/2020 | Valbiotis et al. |

FOREIGN PATENT DOCUMENTS

| CN | 101548982 | 10/2009 |
| CN | 101548982 A * | 10/2009 |

(Continued)

OTHER PUBLICATIONS

Abdullahi Aliyu et al., "Subacute Oral Administration of Clinacanthus nutans Ethanolic Leaf Extract Induced Liver and Kidney Toxicities in ICR Mice", Molecules 2020, 25(11), 2631, Jun. 5, 2020.
(Continued)

*Primary Examiner* — Taylor V Oh
(74) *Attorney, Agent, or Firm* — LEX IP MEISTER, PLLC

(57) ABSTRACT

The present invention relates to a composition for preventing, improving, or treating inflammatory disease containing isookanin or a salt thereof as an active ingredient. The composition containing the isookanin or salt thereof as an active ingredient according to the present invention has no skin irritation and cytotoxicity, and thus has excellent safety for the human body. In addition, it has excellent effects on the inhibition of JAK1 activity, kallikrein-5 activity, TLR-2 activation, COX-2 expression and activity, prostaglandin
(Continued)

PGE$_2$ production, and PGE$_2$-induced angiogenesis, and thus is very effective in preventing, alleviating and treating inflammatory disease. Accordingly, the composition containing the isookanin or salt thereof as an active ingredient according to the present invention may be useful as an active ingredient in a cosmetic composition, a pharmaceutical composition, a composition for skin application and a quasi-drug composition for preventing, alleviating or treating inflammatory disease.

1 Claim, 7 Drawing Sheets

(51) Int. Cl.
*A23L 33/10* (2016.01)
*A61P 29/00* (2006.01)

(58) Field of Classification Search
CPC .......... A23L 33/10; A23L 33/40; A61P 29/00; A61P 17/00; A61P 17/06; A61P 17/10; A61Q 19/00; A61Q 19/005
USPC ........................................................ 514/456
See application file for complete search history.

(56) References Cited

FOREIGN PATENT DOCUMENTS

| | | |
|---|---|---|
| DE | 10031457 A1 | 1/2002 |
| DE | 10031457 C2 | 12/2002 |
| FR | 3076997 A1 | 7/2019 |
| FR | 3076997 B1 | 1/2020 |
| KR | 10-2022-0022494 | 2/2022 |
| WO | 02-00214 | 1/2002 |
| WO | 2019-141802 | 1/2019 |

OTHER PUBLICATIONS

Roxana Cojocariu et al., "Antioxidant Capacity and Behavioral Relevance of a Polyphenolic Extract of Chrysanthellum americanum in a Rat Model of Irritable Bowel Syndrome", Oxidative Medicine and Cellular Longevity, vol. 2019, Article ID 3492767, Aug. 14, 2019.

Jyh-Horng Wu et al., "Effect of Phytocompounds from the Heartwood of Acacia confusa on Inflammatory Mediator Production", J. Agric. Food Chem. 2008, 56, 5, 1567-1573, Feb. 7, 2008.

Ying-Ji Xin et al., "Anti-Inflammatory Activity and Mechanism of Isookanin, Isolated by Bioassay-Guided Fractionation from *Bidens pilosa* L.", Molecules 2021, 26(2), 255, Jan. 6, 2021.

Jong Dae Ji et al., "Prostaglandin E2 (PGE2): Roles in Immune Responses and Inflammation", The Journal of the Korean Rheumatism Association 2004; 11(4): 307-316, Dec. 30, 2004, abstract only.

Tomohiro Aoki et al., "Prostaglandins and chronic inflammation" Trends in pharmacological sciences 33.6 (2012): 304-311, Jun. 2012.

Luisa Minghetti, "Cyclooxygenase-2 (COX-2) in inflammatory and degenerative brain diseases", Journal of Neuropathology & Experimental Neurology 63.9 (2004): 901-910, Sep. 2004.

Robert J D'Amato et al., "Angiogenesis Inhibition in Age-related Macular Degeneration", Ophthalmology 102 (9):1261-2, Sep. 1995.

A.N. Witmer et al., "Vascular endothelial growth factors and angiogenesis in eye disease", Progress in Retinal and Eye Research vol. 22, Issue 1, Jan. 2003, pp. 1-29.

Toshiya Takahashi et al., "The critical and multifunctional roles of antimicrobial peptides in dermatology" Dermatologic clinics 35.1 (2017): 39-50, Jan. 2017.

Daniella M. Schwartz et al., "JAK inhibition as a therapeutic strategy for immune and inflammatory diseases", Nature Reviews Drug Discovery vol. 16, pp. 843-862 (2017), Dec. 2017.

Daniella M. Schwartz et al., "JAK inhibition as a therapeutic strategy for immune and inflammatory diseases", Nature Reviews Drug Discovery Dec. 28, 2017; 17(1):78 Dec. 2017.

Xiao-Wei Yang et al., "Phenolics from Bidens bipinnata and their amylase inhibitory properties", Fitoterapia 83.7 (2012): 1169-1175, Jul. 17, 2012.

Jong Dae Ji et al., "Prostaglandin E2 (PGE2): Roles in Immune Responses and Inflammation", The Journal of the Korean Rheumatism Association 2004; 11(4): 307-316, Dec. 30, 2004.

\* cited by examiner

[FIG. 1]
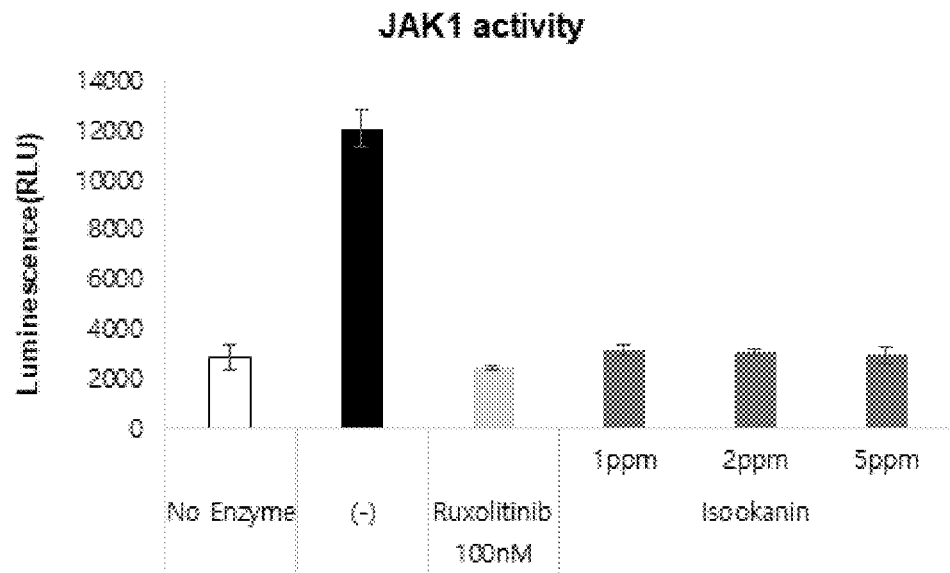
[FIG. 2]
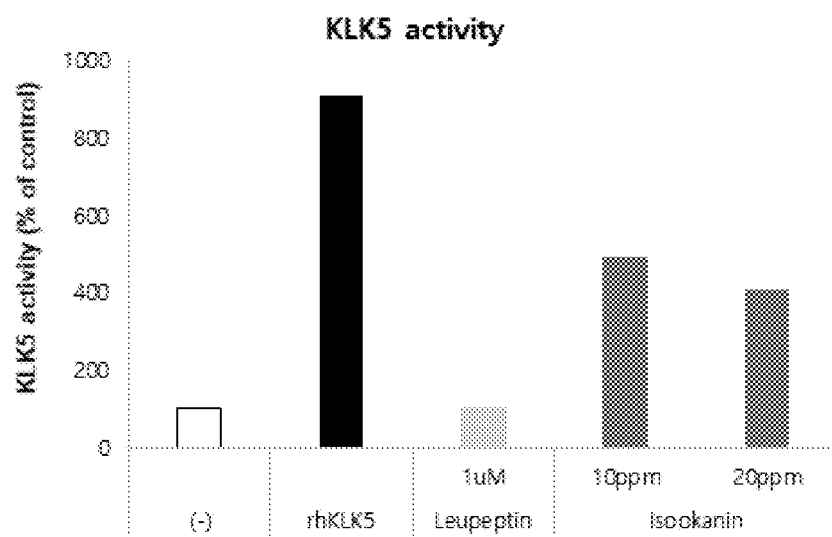

[FIG. 3]
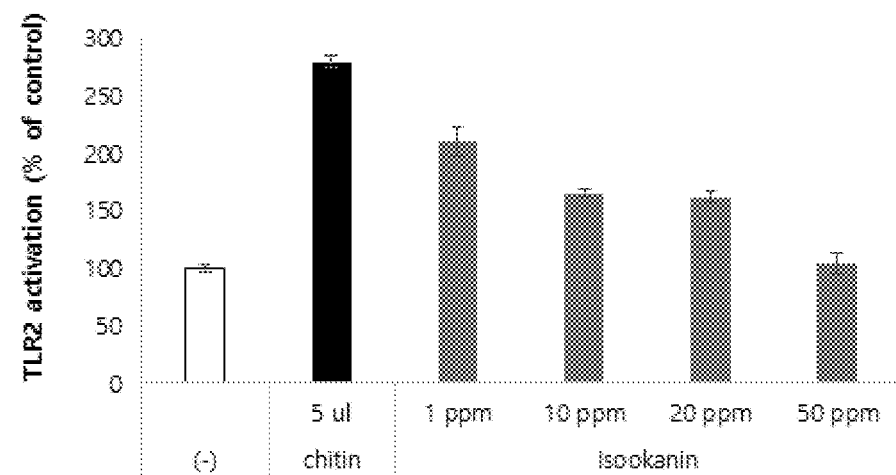
[FIG. 4]
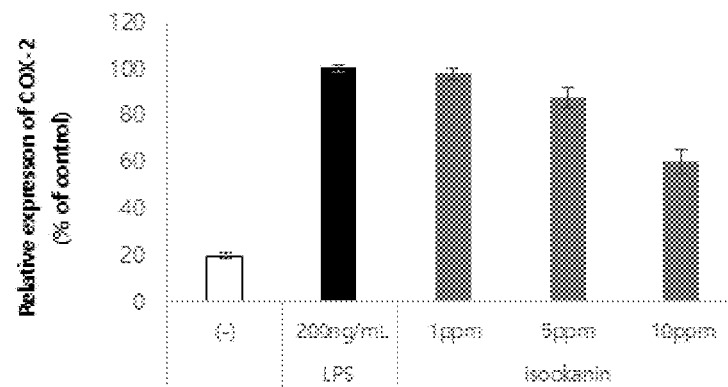

[FIG. 5]
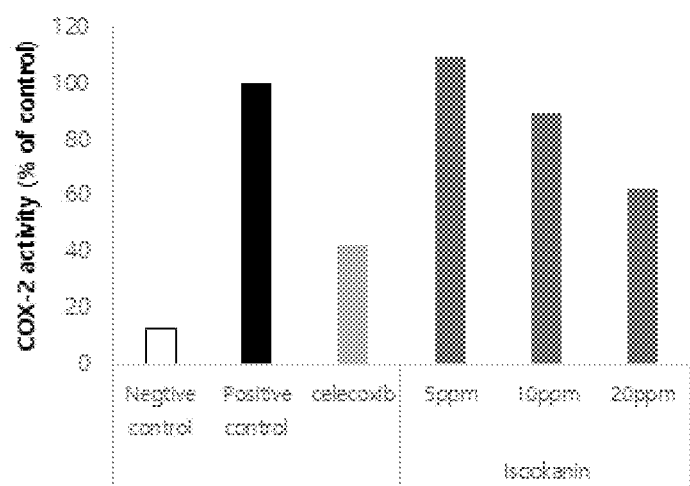
[FIG. 6]
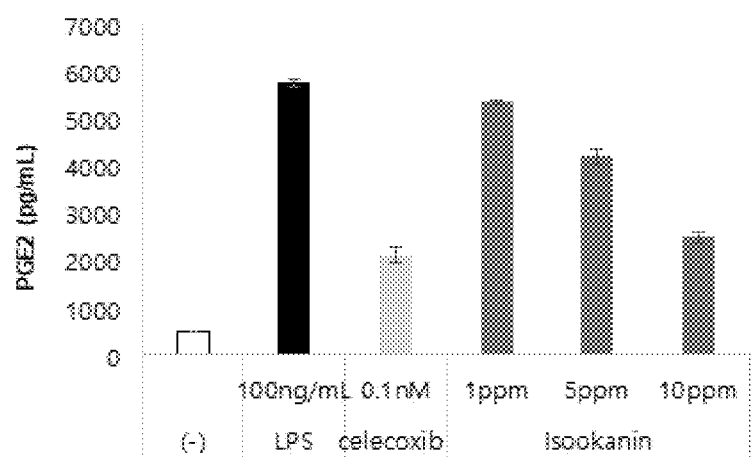

[FIG. 7]
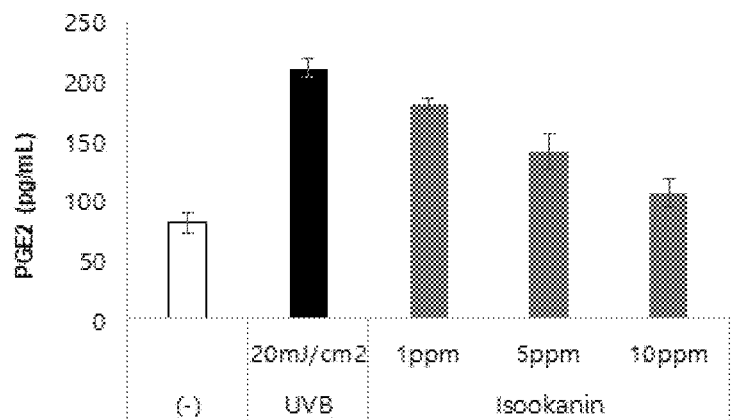
[FIG. 8]
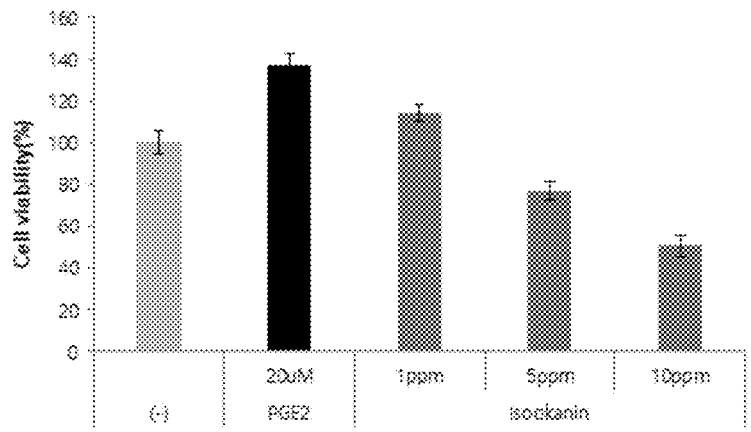

[FIG. 9]
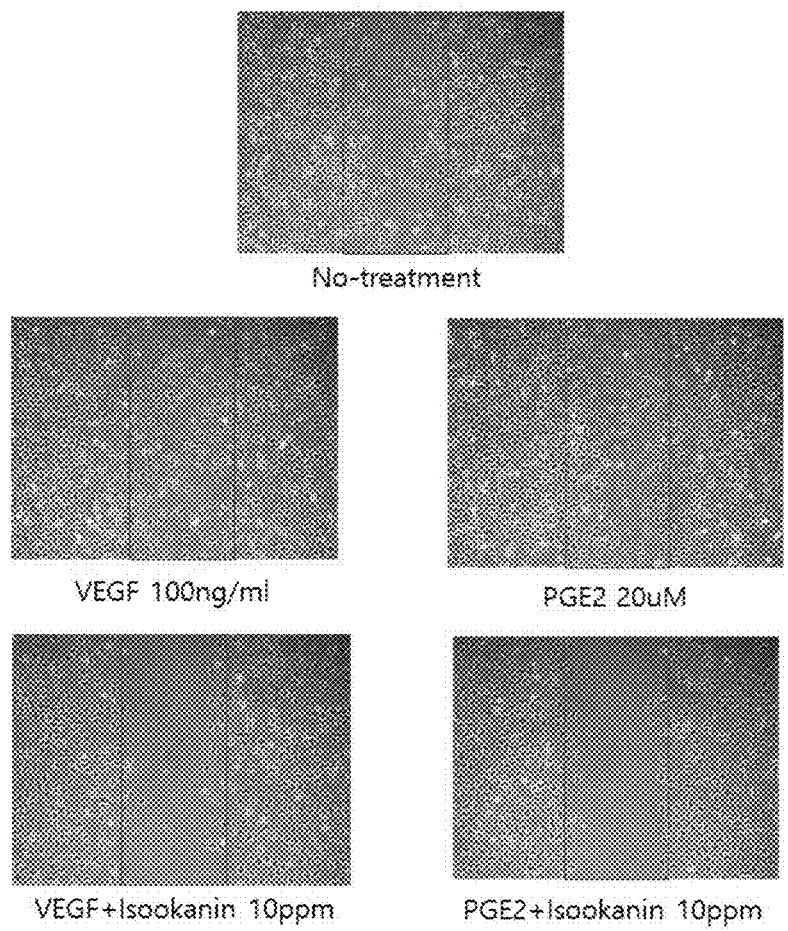
[FIG. 10]
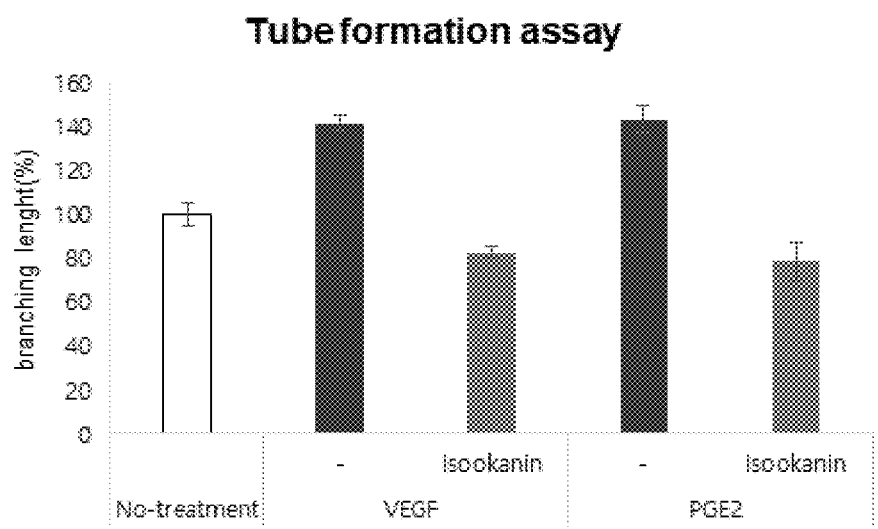

[FIG. 11]
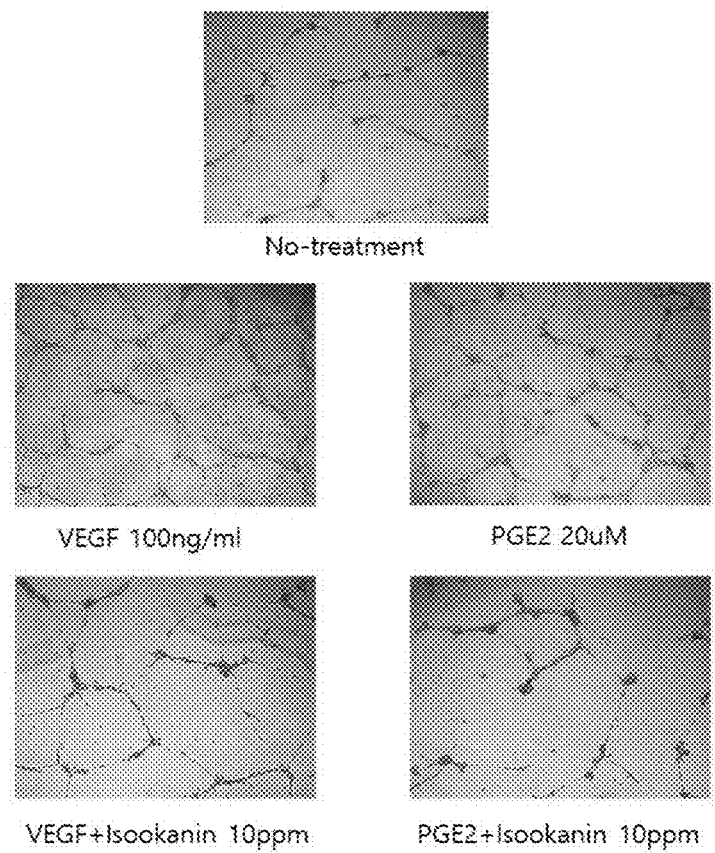

[FIG. 11-1]
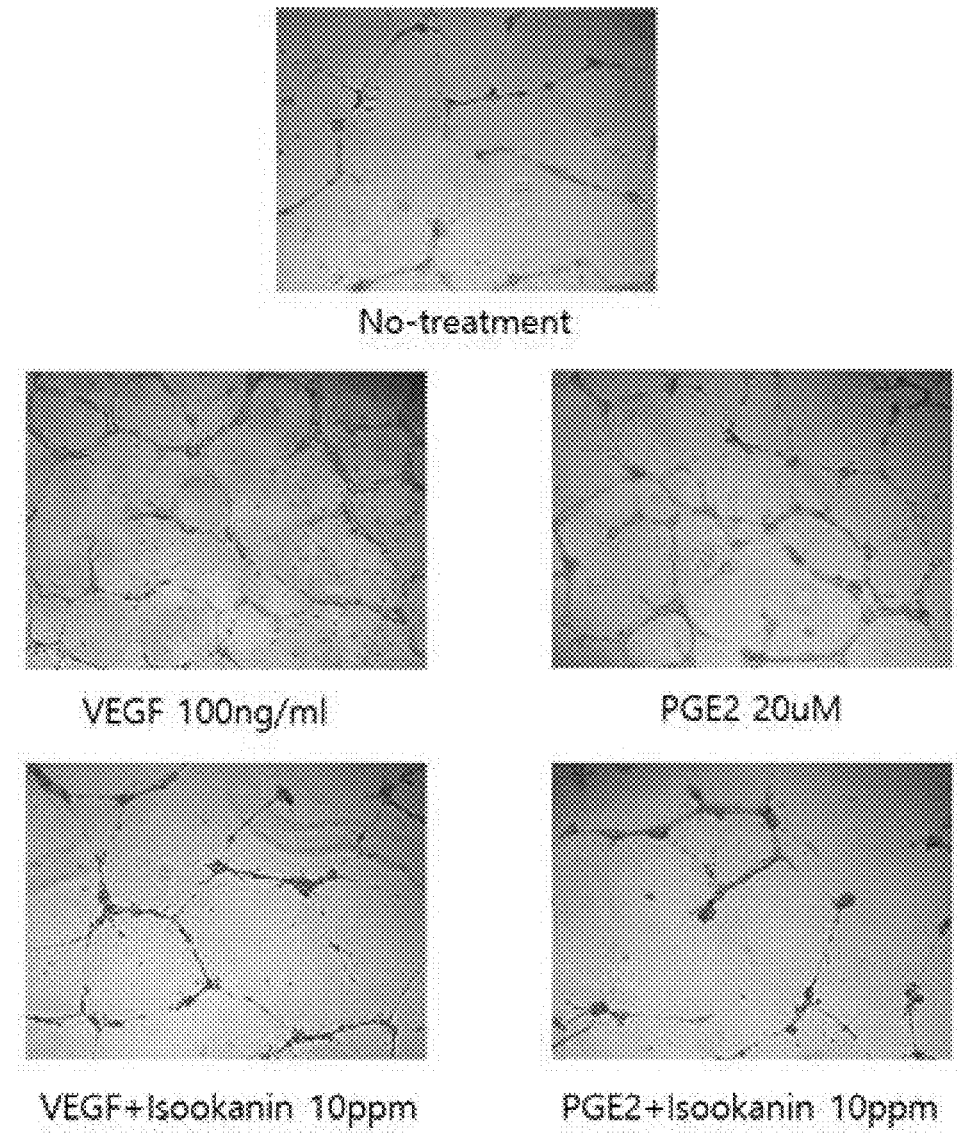

COMPOSITION FOR PREVENTING, ALLEVIATING, OR TREATING INFLAMMATORY DISEASE CONTAINING ISOOKANIN OR SALT THEREOF AS ACTIVE INGREDIENT

TECHNICAL FIELD

The present invention relates to a composition for preventing, alleviating or treating inflammatory disease containing isookanin as an active ingredient. More specifically, the present invention relates to a composition for preventing, alleviating or treating inflammatory disease such as atopic dermatitis, psoriasis, acne, edema, rosacea (erythema of the skin), sunburn, rheumatoid arthritis, osteoarthritis, or inflammatory bowel disease

BACKGROUND ART

Inflammation is a local protective response caused by injury or tissue damage that serves to destroy, reduce, or localize both the injuring agent and the injured tissue. Inflammatory responses are accompanied by a series of complex physiological reactions such as enzyme activation, secretion of inflammatory mediators, body fluid infiltration, cell migration, and tissue destruction, and external symptoms such as erythema, edema, fever, and pain, which appears in association with various inflammatory mediators and immune cells in local blood vessels and body fluids when cells or tissues are damaged or infected with various external infectious agents (bacteria, fungi, viruses, various types of allergens, etc.).

In the case of healthy persons, inflammatory responses remove external infectious agents and regenerate damaged tissues to restore life function, but if antigen is not removed or inflammatory responses are excessive or sustained due to internal substances, diseases that threaten human life appear, such as acute inflammation, diseases within the joints such as rheumatoid arthritis, skin disease in the form of psoriasis or the like, and allergic inflammatory diseases such as bronchial asthma. Therefore, in the development of treatment methods for these diseases, many efforts have been made to find and remove substances involved in inflammatory responses (Jong-Dae Ji et al., 2004).

Prostaglandin (PG), cytokine, chemokine, bradykinin, nitric oxide, histamine, complement, adhesion molecule, and the like are known as substances that mediate inflammation. Among them, prostaglandin is involved in physiological or pathological changes in vivo, such as inflammation, platelet aggregation, and neurotransmitter release. $PGE_2$ is the most well-known and well-studied prostaglandin that mediates vasodilation, edema, fever, pain, and the like (Aoki et al,. 2012). In addition, $PGE_2$ is involved in tissue damage by inducing the production of matrix metalloproteinases (MMPs) in inflammatory diseases such as periodontitis, and a large amount of $PGE_2$ is produced in macrophages obtained from patients with rheumatoid arthritis, and the produced $PGE_2$ plays an important role in inflammatory responses and tissue destruction mechanisms in arthritis (Bingham et al., 2002).

Meanwhile, cyclooxygenases (COXs) are major enzymes associated with various inflammatory diseases and are enzymes that convert arachidonic acid, which is the first step in the PG biosynthesis pathway, into PG. There are two or more COX isoenzymes. Of these, COX-1 is continuously expressed and is responsible for physiological functions such as platelet aggregation, gastric mucosal protection, and renal function regulation, and COX-2 is expressed by stimuli such as inflammation. Therefore, it is known that COXs are targets of nonsteroidal anti-inflammatory drugs (NSAIDs) and play a therapeutic role in the treatment of pain, fever and inflammation. COX-2 in a normal state is known to mediate various physiological events such as immune responses, but abnormal overexpression or overactivation of COX-2 has been reported to be closely related to the onset and development of various diseases (Minghetti et al., 2004). NSAIDs have been widely used for the treatment of various types of acute and chronic inflammatory diseases. However, it have been reported that ulcers occurred in 25% of patients who have taken NSAIDs for a long time, and thus NSAID-related gastrointestinal side effects have become an important problem. Both the inflammation-reducing effect of NSAIDs and the side effects thereof on the gastrointestinal tract are caused by inhibition of cyclooxygenases (COXs). Therefore, the discovery of new COX-2 inhibitors is a way to solve the side effects of NSAIDs in the treatment of inflammatory diseases.

Angiogenesis is a process wherein a new capillary is generated from an existing microvessel. In adults, vascular endothelial cells grow very slowly and do not easily divide compared to other types of cells. Generally, the process of angiogenesis progresses with decomposition of the basal membrane of blood vessels by protease due to the stimulation of angiogenesis-stimulating factors, migration and proliferation of vascular endothelial cells, and tubular formation due to differentiation of vascular endothelial cells, which results in reconstruction of blood vessels to form a new capillary. However, several diseases are caused by abnormal growth of blood vessels without self-regulation of angiogenesis. Angiogenesis-related diseases occurring in pathological conditions include angioma, angiofibroma, vascular malformation, cardiovascular diseases such as atherosclerosis, vascular adhesion, and scleredema, and ophthalmic diseases caused by angiogenesis include keratoplastic angiogenesis, neovascular glaucoma, diabetic retinopathy, neovascular corneal diseases, spot degeneration, pterygium, retinal degeneration, retrolental fibroplasia, granular conjunctivitis, and the like. In addition, chronic inflammatory diseases such as arthritis, skin diseases such as psoriasis, telangiectasis, pyogenic granuloma, seborrheic dermatitis and acne, Alzheimer's disease and obesity are also related to angiogenesis. Furthermore, growth and metastasis of cancer are necessarily dependent on angiogenesis (D'Amato et al., 1996). Many ophthalmic diseases that cause blindness in millions of people worldwide each year are also caused by angiogenesis (Witmer et al., 2003). Since angiogenesis inhibitors may be applied as therapeutic agents for various angiogenesis-related diseases, studies have recently been actively conducted to treat these diseases by inhibiting angiogenesis.

Rosacea, a skin disease caused by inflammatory angiogenesis, is a common chronic inflammatory skin disease characterized by skin erythema, papules, telangiectasias, edema, pustules, or a combination of these symptoms. In rosacea patients, dysregulation of the immune system, which appears in many skin inflammatory diseases such as atopic dermatitis and chronic urticaria, has been found, and increased baseline expression of cathelicidin and kallikrein 5, a predominant serine protease responsible for cleaving cathelicidin into its active form, is observed. In addition, it was observed that the expression of toll like receptor-2 (TLR-2), a major pattern recognition receptor of the innate immune system, increased in rosacea skin disease. It is known that, when TLR-2 is activated by an external stimulus or trigger, it induces an inflammatory response through the production of pro-inflammatory cytokines and chemokines and to increase the expression of kallikrein-5, an epidermal protease. In the skin, the expression of cathelicidin or kallikrein 5 increases due to external changes or an abnormality of the internal immune system, and cathelicidin may be converted into an active peptide such as LL-37 by kallikrein 5 and act on inflammation, angiogenesis, and capillary dilation, causing skin diseases such as hot flushes or rosacea (Takahashi et al., 2017). In addition, a recent study reported that *C. acnes* act inflammatory cytokines by acting on histiocytes and neutrophils, which are important cells for innate immunity, and that toll-like receptor 2 (TLR2) receptors act in this process, suggesting that TLR2, the main mediator of innate immunity caused by *C. acnes*, is involved in the pathogenesis of acne.

Janus kinases (JAKs) are known as enzymes that command proteins that play a central role in immunity and inflammation regulation, and are classified into four types: JAK1, JAK2, JAK3 and TYK2. Among the various functions of JAKs, rapidly providing a signaling pathway to cytokines together with STAT proteins is most known. Briefly, activated JAK phosphorylate the tyrosine residue of the cytokine receptor and bind to STATs that are cytoplasmic gene regulatory proteins. At this time, STATs are phosphorylated and activated by JAKs. Activated STATs dissociate from the receptors, form dimers, translocate to the nucleus, and promote the expression of specific genes. JAK inhibitors are known to alleviate autoimmune diseases, allergic diseases, and chronic inflammatory diseases by inhibiting the action of JAKs, which play an important role in intracellular immune activation signaling, and inhibiting excessive activation of immune responses, and thus they are research targets that has recently attracted attention in dermatitis, vitiligo, hair loss, rheumatoid arthritis, systemic lupus erythematosus, psoriasis, asthma, and inflammatory bowel disease. Selective JAK inhibitors developed to target JAK include Abbvie's Upadacitinib (JAK1 inhibitor, oral), Lilly's Baricitinib (JAK1/2 inhibitor, oral), Pfizer's Abrocitinib (JAK1 inhibitor, oral) and Tofacitinib (Pan JAK inhibitor, Oral), Incyte/Pfizer's Ruxolitinib (JAK1/2 inhibitor, topical), Japan Tobacco's Delgocitinib (Pan JAK inhibitor, oral or topical), etc., which are currently in phase 2 or phase 3 trials, and among them, Ruxolitinib and Tofacitinib have been approved by the FDA.

Meanwhile, isookanin (chemical formula: $C_{15}H_{12}O_6$) is a plant-derived compound, because it was reported that isookanin was isolated as a flavonoid component in Asteraceae. An isookanin derivative (isookanin 7-O-glucoside) isolated from Asteraceae has been reported to have antioxidant activity (Wolniak et al., 2007) and amylase inhibitory activity (Yang et al., 2012). However, it has not yet been reported that isookanin alleviates arthritis, ophthalmic disease, cancer disease, colitis, atopic dermatitis, hot flushes, and rosacea by inhibiting inflammation and angiogenesis.

Accordingly, the present inventors have found that isookanin is effective in alleviating chronic inflammatory diseases, immune diseases, and angiogenesis-related diseases, and has no skin irritation and cytotoxicity, and thus has excellent safety for the human body, thereby completing the present invention.

[Prior Art Documents]
Jong-Dae Ji, Young-Ho Lee, and Kwan-Kyu Song, Review: Prostaglandin E2: Role in Immune and Inflammatory Responses. Journal of Rheumatic Diseases (Journal of the Korean Rheumatism Association) 11(4), 2004, 307-316.

Tomohiro Aoki, Shuh Narumiya, Prostaglandins and chronic inflammation. Trends in Pharmacological Science 33(6), 2012: 304-311

Bingham, Clifton O. The pathogenesis of rheumatoid arthritis: pivotal cytokines involved in bone degradation and inflammation. The Journal of Rheumatology Supplement 65, 2002, 3-9.

Minghetti, Luisa. Cyclooxygenase-2 (COX-2) in inflammatory and degenerative brain diseases. Journal of Neuropathology & Experimental Neurology 63(9), 2004, 901-910.

D'Amato, Robert J., and Anthony P. Adamis. Angiogenesis inhibition in age-related macular degeneration. Ophthalmology 102(9), 1995, 1261-1262.

Witmer et al. Vascular endothelial growth factors and angiogenesis in eye disease. Progress in retinal and eye research 22(1), 2003, 1-29.

Takahashi Toshiya, and Richard L. Gallo. The critical and multifunctional roles of antimicrobial peptides in dermatology." Dermatologic clinics 35(1), 2017, 39-50.

Schwartz et al. JAK inhibition as a therapeutic strategy for immune and inflammatory diseases. Nature Reviews Drug Discovery 16(12), 2017, 843.

Wolniak et al. Antioxidant activity of extracts and flavonoids from *Bidens tripartita*. Acta Pol Pharm 64(5), 2007, 441-447.

Yang et al. Phenolics from *Bidens bipinnata* and their amylase inhibitory properties. Fitoterapia 83(7), 2012, 1169-1175.

DISCLOSURE

Technical Problem

An object of the present invention is to provide a composition for preventing, alleviating or treating inflammatory disease containing isookanin or a salt thereof as an active ingredient.

A specific object of the present invention is to provide a pharmaceutical composition for preventing or treating inflammatory disease containing isookanin or a salt thereof as an active ingredient.

Another specific object of the present invention is to provide a composition for skin application for preventing or alleviating inflammatory disease containing isookanin or a salt thereof as an active ingredient.

Still another specific object of the present invention is to provide a quasi-drug composition for preventing or alleviating inflammatory disease containing isookanin or a salt thereof as an active ingredient.

Yet another specific object of the present invention is to provide a cosmetic composition for preventing or alleviating inflammatory disease containing isookanin or a salt thereof as an active ingredient.

Still yet another specific object of the present invention is to provide a food composition for preventing or alleviating inflammatory disease containing isookanin or a salt thereof as an active ingredient.

A further object of the present invention is to provide a method of preventing, treating or alleviating inflammatory disease in a subject by administering to the subject a composition for preventing, alleviating or treating inflammatory disease containing isookanin or a salt thereof as an active ingredient.

Technical Solution

In one aspect, the present invention provides a composition for preventing, alleviating or treating inflammatory disease containing isookanin or a salt thereof as an active ingredient.

In the present invention, isookanin is a compound ($C_{15}H_{12}O_6$) having a structure represented by the following Formula 1:

[Formula 1]

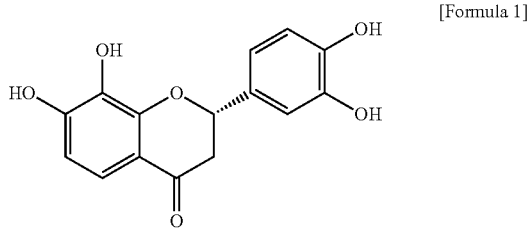 [SMILES: O=C1C[C@@H](c2ccc(O)c(O)c2)Oc2c1ccc(O)c2O]

In the present invention, the salt may be in the form of a pharmaceutically, cosmetically and/or food-acceptable salt or in a form (e.g., a prodrug) that is converted into isookanin in vivo. Examples of such a salt include acid addition salts formed with pharmaceutically, cosmetically and/or food-acceptable free acids, or metal salts formed with bases. As the free acids, inorganic acids and organic acids may be used. Examples of the inorganic acids include hydrochloric acid, sulfuric acid, hydrobromic acid, sulfurous acid, or phosphoric acid. Examples of the organic acids include citric acid, acetic acid, maleic acid, fumaric acid, gluconic acid, methanesulfonic acid, and the like. Examples of the metal salts include an alkali metal salt or an alkaline earth metal salt, and a sodium, potassium or calcium salt may preferably be used.

The isookanin or salt thereof that is used in the present invention may be extracted and isolated from natural sources, chemically synthesized, or synthesized by microorganisms. The natural sources include, but are not necessarily limited to, *Coreopsis tinctoria* Nutt., *Bidens, Albizzia julibrissin* DURAZZ., and okan *Cylicodiscus gabunensis* Harms.

In one specific embodiment, the isookanin or salt thereof of the present invention is able to inhibit the activities of Janus kinases, which are immunoregulatory factors, and inhibit the activation of STATs, which are cytoplasmic gene regulatory proteins, thereby effectively inhibiting inflammatory responses caused by excessive immune responses induced by activated STATs, thereby preventing, alleviating and treating inflammatory diseases.

Therefore, the isookanin or salt thereof of the present invention is useful as an inhibitor of Janus kinase activity.

In a specific embodiment, the isookanin or salt thereof of the present invention is able to inhibit the activation of toll like receptor-2 (TLR-2) signaling and inhibit promoter activation and enzymatic activity in cyclooxygenase-2 (COX-2) transcriptional pathways, thereby inhibiting prostaglandin production, thereby alleviating inflammatory bowel disease, osteoarthritis, headache, or pain caused by tissue wounds or inflammation, and inhibiting prostaglandin-induced angiogenesis. In addition, it able to inhibit the activity of epidermal protease kallikrein-5, thereby inhibiting the activation of the peptide LL-37, thereby preventing, alleviating and treating various diseases induced by inflammatory agents.

Therefore, the isookanin or salt thereof of the present invention is useful as an inhibitor of TLR-2 activity, an inhibitor of COX-2 activity, an inhibitor of prostaglandin activity, and an inhibitor of kallikrein-5 activity.

Accordingly, the isookanin or salt thereof of the present invention is useful for the prevention, alleviation and treatment of inflammatory diseases caused by excessive inflammatory responses caused by the external environment or the internal factors of the human body.

In the present invention, "inflammation" is a local protective response caused by injury or tissue damage that serves to destroy, reduce, or localize both the injuring agent and the injured tissue.

In the present invention, the "inflammatory disease" is a disease in which inflammation is the main lesion, and examples thereof include, but are not necessarily limited to, gastrointestinal inflammatory diseases, skin inflammatory diseases, respiratory inflammatory diseases, ocular inflammatory diseases, autoimmune diseases, etc.

The gastrointestinal inflammatory diseases include various inflammatory diseases of the gastrointestinal tract, including, but not limited to, inflammatory bowel disease, ulcerative colitis (proctosigmoiditis, pancolitis, ulcerative proctitis and left colitis), Crohn's disease, collagenous colitis, lymphocytic colitis, Behcet's disease, celiac disease, immune checkpoint inhibitor-induced colitis, ileitis, eosinophilic esophagitis, graft-versus-host disease-associated colitis, and infectious colitis.

The skin inflammatory diseases include a number of dermal inflammatory or pruritic conditions, including, but not limited to, atopic dermatitis, alopecia areata, vitiligo, psoriasis, acne, edema, hot flushes, rosacea, cutaneous erythema, sunburn, dermatomyositis, cutaneous T-cell lymphoma and subtypes (Sezary syndrome, mycosis fungoides, pagetoid reticulosis, granulomatous slack skin, lymphomatoid papulosis, *pityriasis lichenoides* chronica, *pityriasis lichenoides* et *varioliformis acuta*, CD30+ cutaneous T-cell lymphoma, secondary cutaneous CD30+ large cell lymphoma, non-mycosis fungoides CD30− cutaneous large T-cell lymphoma, pleomorphic T-cell lymphoma, Lennert lymphoma, subcutaneous T-cell lymphoma, angiocentric lymphoma, blastic NK-cell lymphoma), prurigo nodularis, lichen planus, primary localized cutaneous amyloidosis, bullous pemphigoid, skin manifestations of graft versus host disease, pemphigoid, discoid lupus, granuloma annulare, lichen simplex chronicus, vulvar/scrotal/perianal pruritus, lichen sclerosus, post herpetic neuralgia itch, lichen planopilaris, and foliculitis decalvans.

The respiratory inflammatory diseases include a number of respiratory-related inflammatory diseases, including, but not limited to, asthma, chronic obstructive pulmonary disease, cystic fibrosis, pneumonitis, chronic obstructive pulmonary disease (COPD), cystic fibrosis (CF), pneumonitis, interstitial lung diseases (including idiopathic pulmonary fibrosis), acute lung injury, acute respiratory distress syndrome, bronchitis, emphysema, bronchiolitis obliterans, bronchiolitis obliterans organizing pneumonia (also termed COS), primary graft dysfunction (PGD), organizing pneumonia (OP), acute rejection (AR), lymphocytic bronchiolitis (LB), chronic lung allograft dysfunction (CLAD), restrictive CLAD (rCLAD or RAS), neutrophilic allograft dysfunction, allergic rhinitis or sarcoidosis.

The ocular inflammatory diseases include a number of ocular diseases that include, but are not limited to, uveitis, diabetic retinopathy, diabetic macular edema, dry eye disease, age-related macular degeneration, retinal vein occlusion (RVO) and atopic keratoconjunctivitis.

The autoimmune diseases and the like include other inflammatory diseases, autoimmune diseases or cancer, and examples thereof include arthritis, rheumatoid arthritis, juvenile rheumatoid arthritis, transplant rejection, xerophthalmia, psoriatic arthritis, diabetes, insulin dependent diabetes, motor neuron disease, myelodysplastic syndrome, pain, sarcopenia, cachexia, septic shock, systemic lupus erythematosus, leukemia, chronic lymphocytic leukemia, chronic myelocytic leukemia, acute lymphoblastic leukemia, acute myelogenous leukemia, ankylosing spondylitis, myelofibrosis, B-cell lymphoma, hepatocellular carcinoma, Hodgkin's disease, breast cancer, multiple myeloma, melanoma, non-Hodgkin lymphoma, non-small-cell lung cancer, ovarian clear cell carcinoma, ovary tumor, pancreas tumor, polycythemia vera, Sjogren's syndrome, soft tissue sarcoma, sarcoma, splenomegaly, T-cell lymphoma, and thalassemia major.

The composition containing isookanin or a salt thereof according to the present invention may be used in combination with one or more active agents which act by the same mechanism or by different mechanisms to effect the prevention, alleviation or treatment of the above-described gastrointestinal inflammatory diseases, skin inflammatory diseases, respiratory inflammatory diseases, ocular inflammatory diseases, autoimmune diseases, and the like.

Examples of the active agents include, but are not limited to, aminosalicylates, steroids, histamine Hi receptor antagonists, histamine H4 receptor antagonists, calcineurin inhibitors, systemic immunosuppressants, anti-TNFα antibodies, TNF alpha ligand inhibitors, TNF binding agents, anti-VLA-4 antibodies, anti-integrin α4β7 antibodies, anti-bacterial agents, glucocorticoid agonists, nuclear factor kappa B inhibitors, 5-lipoxygenase inhibitors, integrin alpha-4/beta-7 antagonists, cyclooxygenase inhibitors, IL-2 antagonists, IL-4 antagonists, IL-5 antagonists, IL-10 antagonists, IL-12 antagonists, IL-13 antagonists, IL-17 antagonists, IL-23 antagonists, leukotriene BLT receptor antagonists, IL-6 antagonists, IL-8 antagonists, integrin antagonists, IL-4 receptor modulators, nicotinic acetylcholine receptor agonists, PPAR gamma agonists, sphingosine-1-phosphate receptor-1 modulators, B-lymphocyte antigen CD20 inhibitors, calcineurin inhibitors, CD3 antagonists, cell adhesion molecule inhibitors, eosinophil peroxidase inhibitors, heparin agonists, ICAM1 gene inhibitors, IL-13 antagonists, IL-2 receptor alpha subunit inhibitors, insulin sensitizers, interferon beta ligands, interferon gamma receptor antagonists, an interleukin-1 beta ligand modulator, MAdCAM inhibitors, PDE 4 inhibitors, sphingosine-1-phosphate receptor-1 agonists, TLR-9 agonists, acetylcholinesterase inhibitors, ACTH receptor agonists, activin receptor antagonists, CCR5 chemokine antagonists, CCR9 chemokine antagonists, PDE 4 inhibitors, G-protein-coupled receptor-44 antagonists, 5-HT 1a receptor antagonists, 5-HT 2b receptor antagonists, alpha 2 adrenergic receptor agonists, cannabinoid CB1 receptor antagonists, CCR3 chemokine antagonists, collagenase inhibitors, cytosolic phospholipase A2 inhibitors, eotaxin ligand inhibitors, GATA 3 transcription factor inhibitors, immunoglobulin E antagonists, immunoglobulin E modulators, interferon gamma receptor antagonists, interleukin 33 ligand inhibitors, interleukin-31 receptor antagonists, leukotriene antagonists, liver X receptor agonists, liver X receptor beta agonists, nuclear factor kappa B inhibitors, OX-40 receptor antagonists, PGD2 antagonists, phospholipase A2 inhibitors, SH2 domain inositol phosphatase 1 stimulators, thymic stromal lymphprotein ligand inhibitors, TLR modulators, TNF alpha ligand modulators, vanilloid VR1 antagonists, and anti-diarrhea drugs.

Examples of the aminosalicylates include, but are not limited to, mesalamine, osalazine and sulfasalazine. Examples of the steroids include, but are not limited to, prednisone, prednisolone, hydrocortisone, budesonide, beclomethasone, and fluticasone. Systemic immunosuppressants useful for the treatment of inflammatory disorders include, but are not limited to, cyclosporine, azathioprine, methotrexate, 6-mercaptopurine and tacrolimus. Further, anti-TNFα antibodies, including, but not limited to, infliximab, adalimumab, golimumab, and certolizumab, may be used in combination therapy. Useful compounds acting by other mechanisms include anti-VLA-4 antibodies, such as natalizumab, anti-integrin α4β7 antibodies, such as vedolizumab, anti-bacterial agents, such as rifaximin, and anti-diarrheal medicines, such as loperamide.

The composition for preventing, alleviating or treating inflammatory disease containing isookanin or a salt thereof as an active ingredient according to the present invention contains isookanin or a salt thereof in an amount of 0.0001 to 70.0 wt %, preferably 0.001 to 68.0 wt %, more preferably 0.001 to 50 wt %, based on the total weight of the composition. If the content of isookanin or salt thereof is less than 0.0001 wt %, the effect of preventing, alleviating or treating inflammatory diseases cannot be expected, and if the content is more than 70.0 wt %, the effect of alleviating the symptoms of inflammatory diseases by the increased content may be insignificant and difficulties may arise in preparing formulations.

In one specific embodiment, the composition of the present invention is provided as a pharmaceutical composition for preventing or treating inflammatory disease.

The effects of isookanin or salt thereof on the prevention or treatment of inflammatory diseases, such as gastrointestinal inflammatory diseases, skin inflammatory diseases, respiratory inflammatory diseases, ocular inflammatory diseases, and autoimmune diseases, are as described above.

As used herein, the term "prevention" refers to any action that suppresses or delays the onset of inflammatory disease by administration of a pharmaceutical composition according to the present invention, and the term "treatment" refers to any action that alleviates or beneficially changes symptoms in a subject, who is suspected of having or has inflammatory disease, by administration of the pharmaceutical composition.

In the present invention, the prevention or treatment of the inflammatory disease may be achieved by inhibiting the activity of Janus kinases using the isookanin, thereby inhibiting the activation of STATs, which are cytoplasmic gene regulatory proteins, thereby inhibiting an inflammation caused by excessive immune responses induced by activated STATs, and/or inhibiting the activation of toll like receptor-2 (TLR-2) signaling, and inhibiting the expression and activity of cyclooxygenase-2, which is an enzyme that produces prostaglandin, and inhibiting angiogenesis induced by prostaglandin and inhibiting the activity of the epidermal protease kallikrein-5, thereby inhibiting the activation of the peptide LL-37.

As used herein, the term "pharmaceutical composition" means one prepared for the purpose of preventing or treating a disease. For use, the pharmaceutical composition may be formulated in various forms according to conventional methods. For example, it may be formulated in oral dosage forms such as powders, granules, tablets, capsules, suspensions, emulsions, syrups, aerosols, etc., or may be formulated in parenteral dosage forms using diluents or excipients such as lubricants, wetting agents, flavoring agents, emulsifiers, suspending agents, preservatives, surfactants, etc. In addition, it may be formulated and used in dosage forms such as external preparations, suppositories, skin external preparations, and sterile injectable solutions. As a specific example, the composition of the present invention may be used by a method such as directly applying or spreading to a skin lesion with skin inflammatory disease. The composition of the present invention is not limited to the above site and may be applied to any site with inflammatory disease.

In addition, the composition of the present invention may be prepared to further contain pharmaceutically acceptable carriers known in the art, such as buffers, analgesics, solubilizers, isotonic agents, stabilizers, and bases, according to each formulation.

As used herein, the term "pharmaceutically acceptable carrier" may refer to a carrier or diluent that neither causes irritation to an organism nor abolishes biological activities or properties of an active ingredient to be administered thereto. Types of carriers that may be used in the present invention are not particularly limited, and any carrier may be used as long as it is conventionally used in the art and is pharmaceutically acceptable. Non-limiting examples of the carrier include saline, sterile water, Ringer's solution, buffered saline, an albumin injection solution, a dextrose solution, a maltodextrin solution, glycerol, ethanol, etc. These carriers may be used alone or in combination of two or more. The carrier may be a non-naturally occurring carrier.

The composition of the present invention may be administered in a pharmaceutically effective amount. The term "pharmaceutically effective amount" refers to an amount that is sufficient to treat a disease at a reasonable benefit/risk ratio applicable to any medical treatment and causes no side effects. The effective dose level may be determined depending on factors, the patient's health status, the type and severity of disease, the activity of the drug, sensitivity to the drug, the mode of administration, the time of administration, excretion rate, the duration of treatment, the drug content, and drugs used in combination with the composition, as well as other factors well known in the medical field. Specifically, the effective dose is generally 0.001 mg to 300 mg per day per 1 kg of the body weight of the subject to be administered, and the pharmaceutical composition may be administered once or several times a day at regular time intervals according to the judgment of a doctor or pharmacist, without being limited thereto.

In addition, the pharmaceutical composition of the present invention may be used alone or in combination with other pharmaceutically active compounds exhibiting an effect of preventing or alleviating inflammatory diseases or in a suitable set. Examples of the active compounds are as described above.

The pharmaceutical composition of the present invention may be administered as an individual therapeutic agent or in combination with other therapeutic agents, and may be administered sequentially or simultaneously with conventional therapeutic agents. The pharmaceutical composition may be administered in a single or multiple dosage form. It is important to administer the pharmaceutical composition in the minimum amount that can exhibit the maximum effect without causing side effects, in view of all the above-described factors, and this amount can be easily determined by a person skilled in the art.

As used herein, the term "administration" or "administering" means introducing the pharmaceutical composition of the present invention to a subject by any suitable method. The composition of the present invention may be administered orally or parenterally through various routes as long as it can reach the target tissue.

The mode of administration of the pharmaceutical composition according to the present invention is not particularly limited, and may follow a method commonly used in the art. As a non-limiting example of the mode of administration, the composition may be administered orally or parenterally. As a specific example, the composition of the present invention may be used by a method such as directly applying or spreading the composition to a skin lesion having skin inflammatory disease.

The pharmaceutical composition according to the present invention may be prepared into various formulations depending on the desired mode of administration.

The frequency of administration of the composition of the present invention is not particularly limited, but the composition may be administered once a day or may be administered several times a day at divided doses.

In another aspect, the present invention provides a method for preventing or treating inflammatory disease comprising a step of administering to a subject a pharmaceutical composition containing isookanin or a salt thereof.

The isookanin or salt thereof, and the preventive and therapeutic effects against inflammatory disease are as described above.

As used herein, the term "subject" may refer to any animals, including humans, who have or may have inflammatory disease. The animals include, but are not limited to, not only humans but also mammals such as cattle, horses, sheep, pigs, goats, camels, antelopes, dogs, and cats, in need of treatment for a similar symptom to the humans.

The method for preventing or treating inflammatory disease according to the present invention may comprise a step of a pharmaceutically effective amount of the composition to a subject having or being at risk of developing inflammatory disease. The method for administration is as described above.

As used herein, the term "prevention" refers to any action that suppresses or delays the onset of inflammatory disease by administration of a pharmaceutical composition according to the present invention.

The term "treatment" refers to any action that alleviates or beneficially changes symptoms in a subject, who is suspected of having or has inflammatory disease, by administration of the pharmaceutical composition.

Details regarding the pharmaceutical composition containing isookanin or a salt thereof are as described above.

For administration, the composition of the present invention may contain a pharmaceutically acceptable carrier, excipient or diluent in addition to the active ingredients described above. Examples of the carrier, excipient and diluent include lactose, dextrose, sucrose, sorbitol, mannitol, starch, acacia gum, alginate, gelatin, calcium silicate, microcrystalline cellulose, polyvinylpyrrolidone, cellulose, water, syrup, methyl cellulose, methylhydroxybenzoate, propylhydroxybenzoate, talc, magnesium stearate, and mineral oil.

A suitable dosage of the composition of the present invention varies depending on the condition and weight of a patient, the severity of the disease, the type of drug, and the time of administration, but may be appropriately selected by those skilled in the art. Specifically, the dose of the isookanin or salt thereof may be 50 to 300 mg/kg. In addition, when the composition is an external preparation, it is preferably applied 1 to 5 times a day for 1 month or more in an amount of 1.0 to 3.0 ml for an adult. However, the dosage is not intended to limit the scope of the present invention.

In one specific embodiment, the composition of the present invention is provided as a cosmetic composition for preventing or alleviating skin inflammatory disease.

Details regarding the isookanin or salt thereof and the prevention or alleviation of inflammatory disease, particularly skin inflammatory disease, are as described above.

As used herein, the term "alleviation" refers to any action that alleviates or beneficially changes symptoms in a subject, who is suspected of having or has inflammatory disease, by administration of the composition for preventing, alleviating or treating inflammatory disease. That is, the term "alleviation" means suppressing, reducing or eliminating the onset of inflammatory disease in a subject, which is caused by inflammation due to excessive immune responses or is caused by the expression or increased activity of epidermal protease kallikrein-5.

In the present invention, the prevention or alleviation of skin inflammatory disease may be achieved by inhibiting the activity of Janus kinases using the isookanin, thereby inhibiting the activation of STATs, which are cytoplasmic gene regulatory proteins, thereby inhibiting an inflammation caused by excessive immune responses induced by activated STATs, and/or inhibiting the activation of toll like receptor-2 (TLR-2) signaling, and inhibiting the expression and activity of cyclooxygenase-2, which is an enzyme that produces prostaglandin, and inhibiting angiogenesis induced by prostaglandin and inhibiting the activity of epidermal protease kallikrein-5, thereby inhibiting the activation of the peptide LL-37.

The isookanin or salt thereof according to the present invention is contained in an amount of 0.0001 to 70.0 wt %, preferably 0.001 to 68.0 wt %, based on the total weight of the cosmetic composition. If the content of the isookanin or salt thereof is less than 0.0001 wt %, it may be difficult to expect the effect of alleviating and preventing skin inflammatory diseases, for example, atopic dermatitis, alopecia areata, vitiligo, psoriasis, acne, edema, hot flushes, rosacea, cutaneous erythema, sunburn, dermatomyositis, cutaneous T-cell lymphoma and subtypes (Sezary syndrome, mycosis fungoides, pagetoid reticulosis, granulomatous slack skin, lymphomatoid papulosis, *pityriasis lichenoides* chronica, *pityriasis lichenoides* et *varioliformis acuta*, CD30+ cutaneous T-cell lymphoma, secondary cutaneous CD30+ large cell lymphoma, non-mycosis fungoides CD30− cutaneous large T-cell lymphoma, pleomorphic T-cell lymphoma, Lennert lymphoma, subcutaneous T-cell lymphoma, angiocentric lymphoma, blastic NK-cell lymphoma), prurigo nodularis, lichen planus, primary localized cutaneous amyloidosis, bullous pemphigoid, skin manifestations of graft versus host disease, pemphigoid, discoid lupus, granuloma annulare, lichen simplex chronicus, vulvar/scrotal/perianal pruritus, lichen sclerosus, post herpetic neuralgia itch, lichen planopilaris, and foliculitis decalvans, and if the content is more than 70.0 wt %, the effect of alleviating the symptoms of inflammatory diseases by the increased content may be insignificant and difficulties may arise in preparing cosmetic formulations.

In the present invention, the cosmetic composition may further contain ingredients commonly used in cosmetic compositions, in addition to the isookanin or salt thereof as an active ingredient. For example, conventional adjuvants and carriers such as antioxidants, stabilizers, solubilizers, vitamins, pigments and flavoring agents may be contained.

The cosmetic composition may be prepared in any formulation commonly prepared in the art. For example, it may be formulated as a solution, suspension, emulsion, paste, gel, cream, lotion, powder, soap, surfactant-containing cleanser, oil, powder foundation, emulsion foundation, wax foundation or spray. More specifically, it may be prepared into formulations such as nourishing cream, astringent lotion, softening lotion, lotion, essence, nourishing gel or massage cream. However, the present invention is not particularly limited thereto.

When the formulation of the cosmetic composition is a paste, cream or gel, it may contain, as carrier components, animal oil, vegetable oil, wax, paraffin, starch, tragacanth, cellulose derivatives, polyethylene glycol, silicone, bentonite, silica, talc, or zinc oxide.

When the formulation of the cosmetic composition is powder or spray, it may contain, as carrier components, lactose, talc, silica, aluminum hydroxide, calcium silicate, or polyamide powder. Particularly, when it is a spray formulation, it may additionally contain a propellant, such as chlorofluorohydrocarbon, propane/butane, or dimethyl ether.

When the formulation of the cosmetic composition is a solution or emulsion, it may contain, as carrier components, a solvent, a solubilizing agent or an emulsifying agent, for example, water, ethanol, isopropanol, ethyl carbonate, ethyl acetate, benzyl alcohol, benzyl benzoate, propylene glycol, 1,3-butyl glycol oil, glycerol fatty ester, polyethylene glycol, or sorbitan fatty acid ester.

When the formulation of the cosmetic composition is a suspension, it may contain, as carrier components, a liquid diluent, such as water, ethanol or propylene glycol, and a suspending agent, such as ethoxylated isostearyl alcohol, polyoxyethylene sorbitol ester, or polyoxyethylene sorbitan ester, microcrystalline cellulose, aluminum metahydroxide, bentonite, or tragacanth.

When the formulation of the cosmetic formulation is a surfactant-containing cleansing oil, it may contain, as carrier components, aliphatic alcohol sulfate, aliphatic alcohol ether sulfate, sulfosuccinic monoester, isethionate, imidazolium derivatives, methyl taurate, sarcosinate, fatty acid amide ether sulfate, alkyl amido betaine, aliphatic alcohol, fatty acid glyceride, fatty acid diethanolamide, vegetable oil, lanoline derivatives, or ethoxylated glycerol fatty acid ester.

When the cosmetic composition is soap, a surfactant-containing cleansing formulation, or a surfactant-free cleansing formulation, it may be applied to the skin and then wiped off, removed, or washed off with water. As a specific example, the soap is liquid soap, powder soap, solid soap or oil soap, the surfactant-containing cleansing formulation is a cleansing foam, cleansing water, cleansing towel or cleansing pack, and the surfactant-free cleansing formulation is a cleansing cream, cleansing lotion, cleansing water or cleansing gel, without being limited thereto.

In another specific embodiment, the composition of the present invention is provided as an external preparation composition for preventing or alleviating inflammatory disease.

Details regarding the isookanin or salt thereof and the prevention or alleviation of inflammatory disease are as described above.

The composition for skin application according to the present invention may be formulated to contain a cosmetically or dermatologically acceptable medium or base. The composition may be provided in the form of any topically applicable formulations, for example, a solution, a gel, a solid, an anhydrous paste, an oil-in-water emulsion, a suspension, a micro-emulsion, a microcapsule, a micro-granule, an ionic (liposome) or nonionic vesicular dispersion, a cream, a skin lotion, a milk lotion, a powder, an ointment, a spray or a conceal stick. The composition may also be used in the form of a foam or in the form of an aerosol composition further containing a compressed propellant. These compositions can be prepared according to any convention method known in the art.

In addition, the composition for skin application according to the present invention may contain additives commonly used in the cosmetic or dermatological field, for example, fat, an organic solvent, a solubilizing agent, a concentrating agent, a gelling agent, a softener, an antioxidant, a Suspending agent, a stabilizer, a foaming agent, an aromatic, a surfactant, water, an ionic or non-ionic emulsifier, a filler, a metal ion sequestering agent, a chelating agent, a preservative, vitamins, a blocking agent, a wetting agent, essential oil, dyes, pigments, a hydrophilic or lipophilic activator, lipid vesicles, or the like. These additives may be included in an amount commonly used in the cosmetic or dermatological field.

In another specific embodiment, the composition of the present invention provides a quasi-drug composition for preventing or alleviating inflammatory disease.

Details regarding the isookanin or salt thereof and the prevention or alleviation of inflammatory disease are as described above.

As used herein, the term "quasi-drug" means products exhibiting a milder action than pharmaceuticals among products used for diagnosing, curing, ameliorating, alleviating, treating or preventing a human or animal disease. For example, the quasi-drugs exclude products used as pharmaceuticals, and include products used for treating or preventing human/animal diseases, and products which act weakly or do not act directly on the human body.

Specifically, the quasi-drugs may include external skin preparations and personal hygiene products. More specifically, the quasi-drug may be a disinfectant cleanser, shower foam, mouthwash, wet tissue, detergent soap, hand wash, or ointment, without being limited thereto.

When the composition according to the present invention is used as a quasi-drug additive, the composition may be added as it is or used together with other quasi-drugs or quasi-drug ingredients, and may be appropriately used according to a conventional method. The content of the active ingredient may be appropriately determined depending on the intended use.

The isookanin or salt thereof of the present invention is a substance that has no skin irritation and cytotoxicity and has excellent human body stability, and thus has few side effects on the human body, and it may be safely and usefully used in compositions for preventing, alleviating and treating inflammatory diseases such as atopic dermatitis, psoriasis, acne, hot flushes, rosacea, gastrointestinal inflammatory diseases, skin inflammatory diseases, respiratory inflammatory diseases, ocular inflammatory diseases, and autoimmune diseases, specifically, cosmetic compositions, pharmaceutical compositions, compositions for skin application, and quasi-drug compositions.

Advantageous Effects

The composition containing the isookanin or salt thereof as an active ingredient according to the present invention has no skin irritation and cytotoxicity, and thus has excellent safety for the human body. In addition, it has excellent effects on the inhibition of JAK1 activity, kallikrein-5 activity, TLR-2 activation, COX-2 expression and activity, prostaglandin $PGE_2$ production, and $PGE_2$-induced angiogenesis, and thus is very effective in preventing, alleviating and treating inflammatory diseases. Accordingly, the composition may be useful as an active ingredient in a cosmetic composition, a pharmaceutical composition, a composition for skin application and a quasi-drug composition for preventing, alleviating or treating inflammatory diseases, particularly, gastrointestinal inflammatory diseases, skin inflammatory diseases, respiratory inflammatory diseases, ocular inflammatory diseases, and autoimmune diseases.

BRIEF DESCRIPTION OF DRAWINGS

FIG. 1 is a graph showing the effect of isookanin on the inhibition of Janus kinase 1.

FIG. 2 is a graph showing the effect of isookanin on the inhibition of kallikrein-5 activity.

FIG. 3 is a graph showing the effect of isookanin on the inhibition of TLR-2 activation.

FIG. 4 is a graph showing the effect of isookanin on the inhibition of LPS-induced activation of COX-2 promoter.

FIG. 5 is a graph showing the effect of isookanin on the inhibition of COX-2 enzyme activity.

FIG. 6 is a graph showing the effect of isookanin on the inhibition of $PGE_2$ expression induced by UV irradiation.

FIG. 7 is a graph showing the effect of isookanin on the inhibition of LPS-induced $PGE_2$ expression.

FIG. 8 is a graph showing the effect of isookanin on the inhibition of human vascular endothelial cell proliferation induced by $PGE_2$ treatment.

FIG. 9 is a graph showing the effect of isookanin on the inhibition of human vascular endothelial cell migration induced by $PGE_2$ treatment.

FIG. 10 is a graph showing the effect of isookanin on the inhibition of human vascular endothelial cell tube formation induced by $PGE_2$ treatment.

FIG. 11 depicts photographs showing the effect of isookanin on the inhibition of human vascular endothelial cell tube formation induced by $PGE_2$ treatment.

BEST MODE

Hereinafter, the present invention will be described in more detail with reference to examples. These examples are only for explaining the present invention in more detail, and it will be apparent to those skilled in the art that the scope of the present invention according to the subject matter of the present invention is not limited by these examples.

Example 1: Measurement of Effect of Isookanin on Inhibition of Janus Kinase 1 Activity The effect of isookanin on the inhibition of Janus kinase 1 activity was measured using the HTRF KinEASE-TK kit (Cisbio, France). HTRF is a time-resolved fluorescence resonance energy transfer technology (TR-FRET) analysis method, which is applied to high-throughput screening (HTS) and is one of the methods widely used in drug development. From general cytokine measurement, enzyme activity, protein phosphorylation, protein-protein interaction, cAMP measurement, and the like can be measured by fluorescence through acceptor/donor reaction, and HTRF has an advantage in that, since measurement is carried out in two wavelength regions, it is possible to reduce interference from buffers and media. All components of the HTRF KinEase™-TK kit were handled according to the instructions. For kinases, the ability of a test substance to inhibit kinase activity is measured by allowing a kinase to react with an appropriate substrate in the presence or absence of a sample and capturing the phosphorylated substrate by a detection reagent. Briefly, the following two steps performed.

Step 1. Kinase Reaction

A kinase is allowed to react with an appropriate substrate in the presence and absence of a sample. Enzyme buffer is used as a control (−) instead of the sample, and the group treated with 100 nM of loxolitinib is used as a positive control. During this step, the kinase phosphorylates the substrate. A TK substrate-biotin is incubated with the kinase, and ATP is added to initiate an enzymatic reaction. The enzyme mixture containing the test sample and ATP is added to a HTRF 96-well low volume plate (Cisbio, France) and allowed to react at room temperature for 15 minutes. Appropriate TK substrate-biotin is added to the mixture and allowed to react for 2 hours.

Step 2. Fluorescence Detection

After completion of the reaction, Eu-cryptate and XL665 conjugates are added to the mixture. The detection reagent captures the phosphorylated substrate, and the resulting TR-FRET signal is proportional to the phosphorylation level.

The results of measuring the ability of isookanin to inhibit Janus kinase 1 activity using the HTRF KinEase™-TK kit are shown in FIG. 1. As shown therein, it could be confirmed that isookanin significantly inhibited Janus kinase 1 activity.

Example 2: Measurement of Effect of Isookanin on Inhibition of Kallikrein-5 Activity To measure the enzymatic activity of kallikrein-5 which is a trypsin-like proteolytic enzyme present in skin keratinocytes, recombinant kallikrein-5 (R&D Systems, USA) was allowed to react with the fluorescently labeled substrate Boc-Val-Pro-Arg-AMC (R&D Systems, USA), and the enzymatic activity was measured. 50 µl of 2 µg/ml recombinant kallikrein-5 was treated with different concentrations (10 and 20 ppm) of isookanin and then allowed to react at room temperature for 10 minutes, and then 50 µl of 800 µM kallikrein-5 substrate was added thereto, followed by measurement in kinetic mode at 380 nm/480 nm fluorescence for 5 minutes. As a positive control, the trypsin inhibitor Leupeptin (Sigma Aldrich, USA) was used, and as a negative control, non-treated recombinant kallikrein was used. For evaluation of the degree of activity, based on the value obtained by subtracting the lowest fluorescence value from the highest fluorescence value among the measurement values under each condition, the fluorescence value of the group treated with isookanin was compared with the fluorescence value of the group not treated with isookanin, and the results are shown in FIG. 2.

FIG. 2 is a graph showing the effect of isookanin on the inhibition of kallikrein-5 activity. As shown therein, isookanin exhibited an inhibitory effect on kallikrein-5 activity in a concentration-dependent manner.

Example 3: Measurement of Effect of Isookanin on Inhibition of TLR-2 Activation

The anti-inflammatory effect of isookanin by inhibition of TLR-2 activation was measured. The HEK-Blue™ TLR2 cell line (InvivoGen, USA) co-transfected with TLR-2 and SEAP (secreted embryonic alkaline phosphatase) reporter genes was used. The SEAP reporter gene contains transcription factors NF-kB and AP-1 binding sites, and thus when NF-kB and AP-1 are activated by TLR-2 activation, SEAP is produced and secreted extracellularly. Specifically, the HEK-Blue™ TLR2 cell line was cultured in DMEM containing 10% FBS, and then seeded in a 48-well plate at a density of $1\times10^5$ cells per well, and pretreated with isookanin for 1 hour. Next, the cells were treated with chitin (Carbosynth, USA) and cultured again for 12 hours. Here, chitin is a component of demodex and is known as a major trigger of inflammatory rosacea. The chitin used in the experiment had a size of 40 to 70 µm and used for treatment of the cells. 20 µl of the culture supernatant of the cells cultured for 12 hours was taken, mixed with 80 µl of QUANTI-Blue™ (InvivoGen, USA), and then incubated at 37° C. for 1 hour. The degree of TLR-2 activation was measured by comparing the degree of color development caused by the reaction between Quanti-Blue and extracellularly secreted SEAP, and the results are shown in FIG. 3.

FIG. 3 is a graph showing the inhibitory effect of isookanin on the activity of TLR-2 signaling. As shown therein, isookanin exhibited an effect of effectively inhibiting the chitin-induced activation of TLR-2 signaling.

Example 4: Measurement of Inhibitory Effect of Isookanin on LPS-Induced Activation of COX-2 Promoter Mouse macrophages (RAW 264.7) were seeded in a 24-well microplate at a density of about $2\times10^5$ cells per well, and cultured in an incubator for 24 hours at 37° C. under 5% $CO_2$. The RAW264.7 cells were transfected with the COX-2 promoter luciferase reporter plasmid, and then treated with 1, 5, and 10 ppm of isookanin, and then treated with LPS (100 ng/mL). After culturing, the cell culture was harvested. Subsequently, luciferase enzyme activity was measured using a microplate reader (Sunrise, Tecan, Switzerland). Mouse macrophages not treated with isookanin and LPS were used as a negative control (−). The results are shown in FIG. 4.

FIG. 4 is a graph showing the inhibitory effect of isookanin on the LPS-induced activation of COX-2 promoter in mouse macrophages. As shown therein, isookanin exhibited an effect of inhibiting the LPS-induced activation of COX-2 promoter in a concentration-dependent manner.

Example 5: Measurement of Inhibitory Effect of Isookanin on COX-2 Enzyme Activity COX-2 enzyme inhibitory activity was measured using a cyclooxygenase (COX) activity assay kit (BioVision). 2 µl of COX probe, 4 µl of diluted COX cofactor, and varying concentrations (5, 10, and 20 ppm) of isookanin were added to the COX assay buffer included in the kit. As a negative control, DMSO was added instead of isookanin, and as a positive control, the COX-2 inhibitor celecoxib was added. The results of measuring COX-2 activity are shown in FIG. 5.

FIG. 5 is a graph showing the COX-2 enzyme inhibitory activity of isookanin. As shown therein, isookanin exhibited an effect of inhibiting the activity of COX-2 enzyme in a concentration-dependent manner.

Example 6: Measurement of Inhibitory Effect of Isookanin on $PGE_2$ Expression Induced by UV Irradiation Human epidermal keratinocytes (HEKs) were seeded in a 24-well microplate at a density of about $2\times10^5$ cells per well, and cultured in an incubator for 24 hours at 37° C. under 5% $CO_2$. Thereafter, the cells were treated with each of 1, 5, and 10 ppm of isookanin, and then irradiated with UV light (UVB 20 $mJ/cm^2$), and then the cell culture medium was collected. Next, the secretion level of $PGE_2$ was measured using an ELISA kit. As a negative control (−), human keratinocytes not treated with isookanin and UV light (UVB) were used. The results are shown in FIG. 6.

FIG. 6 is a graph showing the inhibitory effect of isookanin on UV-induced $PGE_2$ expression in human keratinocytes. As shown therein, isookanin exhibited an effect of inhibiting the expression of $PGE_2$ in a concentration-dependent manner.

Example 7: Measurement of Inhibitory Effect of Isookanin on LPS-Induced $PGE_2$ Expression Mouse macrophages (RAW 264.7) were seeded in a 24-well microplate at a density of about $2\times10^5$ cells per well, and cultured in an incubator for 24 hours at 37° C. under 5% $CO_2$. Thereafter, the cells were treated with each of 1, 5 and 10 ppm of isookanin, and then treated with LPS (100 ng/mL) and cultured, and then the cell culture medium was collected. Next, the secretion level of $PGE_2$ was measured using an ELISA kit. As a negative control group (-), mouse macrophages not treated with isookanin and LPS were used. The results are shown in FIG. 7.

FIG. 7 is a graph showing the inhibitory effect of isookanin on LPS-induced $PGE_2$ expression in mouse macrophages. As shown therein, isookanin exhibited an effect of inhibiting the LPS-induced expression of $PGE_2$ in a concentration-dependent manner.

Example 8: Measurement of Inhibitory Effect of Isookanin on Human Vascular Endothelial Cell Proliferation Induced by $PGE_2$ Treatment Human microvascular epithelial cells (HMEC-1, ATCC, USA) were cultured in MCDB131 medium (Thermo Fisher, USA) containing 10 ng/ml EGF, 1 µg/mL cortisol, 10 mM glutamine and 10% FBS, and then seeded in a 24-well plate at a density of $5\times10^4$ cells per well and cultured in an incubator for 24 hours at cultured at 37° C. under 5% $CO_2$. After culturing, each well was pretreated with each concentration of isookanin for 1 hour, and then treated with 20 µM $PGE_2$ and cultured again for 48 hours. After 48 hours of culturing, the degree of vascular cell proliferation was measured using MTT assay, and the results are shown in FIG. 8.

FIG. 8 is a graph showing the inhibitory effect of isookanin on human vascular endothelial cell proliferation. As shown therein, isookanin exhibited an effect of effectively inhibiting human vascular endothelial cell proliferation induced by $PGE_2$.

Example 9: Measurement of Inhibitory Effect of Isookanin on Human Vascular Endothelial Cell Migration Induced by $PGE_2$ Treatment Human vascular endothelial cells (HMEC-1) were seeded in a 12-well plate at a density of $2\times10^5$ cells per well and cultured in an incubator for 24 hours at 37° C. under 5% $CO_2$. After the cells in each well were grown to 80% confluency, the central part of each well was scratched using a yellow pipette tip. Next, each well was pretreated with each concentration of isookanin for 2 hours and then treated with 20 µM $PGE_2$ and incubated for 24 hours. As a negative control, 100 ng/ml of VEGF was used. After 24 hours of incubation, the degree of vascular cell migration was observed using a microscope, and the results were photographed with a microscope camera and shown in FIG. 9.

FIG. 9 depicts photographs showing the inhibitory effect of isookanin on human vascular cell migration. As shown therein, $PGE_2$ promoted vascular endothelial cell migration, similar to VEGF which is a representative angiogenic factor that induces angiogenesis, and isookanin exhibited an effect of effectively inhibiting human vascular endothelial cell migration induced by $PGE_2$.

Example 10: Measurement of Inhibitory Effect of Isookanin on Human Vascular Cell Tube Formation Induced by $PGE_2$ Treatment Human vascular endothelial cells (HMEC-1) were seeded in a Matrigel-coated 24-well plate at a density of $1.2\times10^5$ cells per well, and each well was pretreated with 10 ppm of isookanin for 2 hours. Next, each well was treated with $PGE_2$ at a concentration of 20 µM and incubated for 24 hours. As a negative control, 100 ng/ml of VEGF was used. After 24 hours of incubation, the degree of vascular cell tube formation was observed using a microscope, and the results were photographed with a microscope camera and analyzed with Image J, and are shown in FIGS. 10 and 11.

FIGS. 10 and 11 are graphs and photographs showing the inhibitory effect of isookanin on human vascular cell tube formation. As shown therein, $PGE_2$ promoted vascular cell tube formation, similar to VEGF which is a representative angiogenic factor that induces angiogenesis, and isookanin exhibited an effect of effectively inhibiting human vascular endothelial cell tube formation induced by $PGE_2$.

Example 11: Human Skin Safety Test for Isookanin

In order to confirm that the isookanin according to the present invention is safe for human skin, a skin safety verification test was performed. To this end, a repeated insult patch test was conducted.

Nourishing creams containing the isookanin in amounts of 0.1%, 0.5% and 1%, respectively, were prepared. Specifically, a water phase containing purified water, triethanolamine and propylene glycol was dissolved by heating to 70° C. and then emulsified by adding a solution obtained by dissolving beeswax, liquid paraffin, an oil component, an emulsifier and a preservative by heating to 70° C. After completion of emulsification, the solution was cooled to 45° C., and the isookanin was added thereto in amounts of 0.1%, 0.5% and 1% and dispersed therein, followed by cooling to 30° C. As the content of the isookanin was increased from 0.1% to 0.5% and 1%, the content of liquid paraffin was decreased from 9.91% to 9.51% and 9.01%, respectively, thereby preparing nourishing creams.

Using the nourishing creams prepared as described above, a repeated insult patch test was conducted on the upper arm areas of 30 healthy adults every other day for a total of 9 times for 24 hours per time to determine whether the isookanin irritated the skin.

The patch test was performed using a Finn chamber (Epitest Ltd., Finland). 15 µl of each of the external skin preparations was dropped into the chamber, and then the patch test was performed. The degree of skin reaction in each patch test was scored using the following Equation 1, and the results are shown in Table 1 below.

[Equation 1]

$$\text{Average degree of reaction} = [[(\text{reaction index} \times \text{degree of reaction})/(\text{total number of subjects} \times \text{highest score (4)}] \times 100] \div \text{number of tests} \qquad (9)$$

In the degree of reaction, ± represents a score of 1, + represents a score of 2, and ++ represents a score of 4. When the average degree of reaction is less than 3, the corresponding composition is determined to be safe.

TABLE 1

| Test substance | Week 1 1st ± + ++ | Week 1 2nd ± + ++ | Week 1 3rd ± + ++ | Week 2 5th ± + ++ | Week 2 6th ± + ++ | Week 2 7th ± + ++ | Week 3 8th ± + ++ | Week 3 9th ± + ++ | Week 3 10th ± + ++ | Average degree of reaction |
|---|---|---|---|---|---|---|---|---|---|---|
| Control (squalene) | - - - | - - - | 1 - - | - - - | - - - | - - | - - - | - | - - - | 0.09 |
| Isookanin (0.1%) [test group 1] | - - - | - - - | - - - | - - - | - - - | - - - | - - - | - - - | - - - | 0.00 |
| Isookanin (0.5%) [test group 2] | - - - | - - - | - - - | - - - | - - - | - - - | - - - | - - - | - - - | 0.00 |
| Isookanin (1%) [test group 3] | - - - | - - - | - - - | - - - | - - - | - - - | - - - | - - - | - - - | 0.00 |

As shown in Table 1 above, the number of subjects corresponding to ±, + and ++ was 0 in all of test groups 1, 2 and 3, and the average degree of reaction was also 0.00. As a result of the above test, it was determined that the isookanin according to the present invention showed an average degree of reaction of 3 or less, indicating that it is a safe substance that shows no remarkable cumulative irritation aspect.

The composition of the present invention may be prepared by the following Formulation Examples, without being limited thereto.

Formulation Example 1: Cosmetic Formulations

Formulation Example 1-1: Softening Lotion

As shown in Table 2 below, a softening lotion containing isookanin as an active ingredient was prepared according to a conventional method.

TABLE 2

| Component | wt % |
|---|---|
| Isookanin | 0.01 |
| Glycerin | 3.0 |
| Butylene glycol | 2.0 |
| Propylene glycol | 2.0 |
| Carboxyvinyl polymer | 0.1 |
| Ethanol | 10.0 |
| Triethanolamine | 0.1 |
| Preservative, trace colorant, trace fragrance and trace purified water | 82.79 |
| Sum | 100.0 |

Formulation Example 1-2: Nourishing Lotion

As shown in Table 3 below, a nourishing lotion containing isookanin as an active ingredient was prepared according to a conventional method.

TABLE 3

| Component | wt % |
|---|---|
| Isookanin | 0.01 |
| Beeswax | 4.0 |
| Polysorbate 60 | 1.5 |
| Sorbitan sesquioleate | 0.5 |
| Liquid paraffin | 5.0 |
| Squalene | 5.0 |
| Caprylic/capric triglyceride | 5.0 |
| Glycerin | 3.0 |
| Butylene glycol | 3.0 |
| Propylene glycol | 3.0 |
| Carboxyvinyl polymer | 0.1 |
| Triethanolamine | 0.2 |
| Preservative, trace colorant, trace fragrance and trace purified water | 69.69 |
| Sum | 100.0 |

Formulation Example 1-3: Nourishing Cream

As shown in Table 4 below, a nourishing lotion containing isookanin as an active ingredient was prepared according to a conventional method.

TABLE 4

| Component | wt % |
|---|---|
| Isookanin | 0.01 |
| Beeswax | 10.0 |
| Polysorbate 60 | 1.5 |
| Sorbitan sesquioleate | 0.5 |
| Liquid paraffin | 10.0 |
| Squalene | 5.0 |
| Caprylic/capric triglyceride | 5.0 |
| Glycerin | 5.0 |
| Butylene glycol | 3.0 |
| Propylene glycol | 3.0 |
| Triethanolamine | 0.2 |
| Preservative, trace colorant, trace fragrance and trace purified water | 56.79 |
| Sum | 100.0 |

Formulation Example 1-4: Massage Cream

As shown in Table 5 below, a massage cream containing isookanin as an active ingredient was prepared according to a conventional method.

TABLE 5

| Component | wt % |
| --- | --- |
| Isookanin | 0.01 |
| Beeswax | 10.0 |
| Polysorbate 60 | 1.5 |
| Sorbitan sesquioleate | 0.8 |
| Liquid paraffin | 40.0 |
| Squalene | 5.0 |
| Caprylic/capric triglyceride | 4.0 |
| Glycerin | 5.0 |
| Butylene glycol | 3.0 |
| Propylene glycol | 3.0 |
| Triethanolamine | 0.2 |
| Preservative, trace colorant, trace fragrance and trace purified water | 27.49 |
| Sum | 100.0 |

Formulation Example 1-5: Pack

As shown in Table 6 below, a pack containing isookanin as an active ingredient was prepared according to a conventional method.

TABLE 6

| Component | wt % |
| --- | --- |
| Isookanin | 0.01 |
| Polyvinyl alcohol | 13.0 |
| Sodium carboxymethyl cellulose | 0.2 |
| Allantoin | 0.1 |
| Ethanol | 5.0 |
| Nonylphenyl ether | 0.3 |
| Preservative, trace colorant, trace fragrance tand race purified water | 81.39 |
| Sum | 100.0 |

Formulation Example 2: Pharmaceutical Formulations

Formulation Example 2-1: Preparation of Ointment

TABLE 7

| Component | Content (g) |
| --- | --- |
| Isookanin | 1.0 |
| Diethanolamine | 1.5 |
| Polyvinyl pyrrolidone | 5.0 |
| Propylene glycol | 30.0 |
| Purified water | 62.5 |
| Sum | 100.0 |

Formulation Example 2-2: Preparation of Soft Capsule

TABLE 8

| Component | Content (mg) |
| --- | --- |
| Isookanin | 1 |
| Gelatin | 141 |
| Glycerol | 56.5 |
| Ethyl vanillin | 1 |
| Methyl paraoxybenzoate | 0.45 |
| Propyl paraoxybenzoate | 0.05 |
| Sum | 200.00 |

The invention claimed is:

1. A method of alleviating or treating skin inflammatory disease in a subject comprising
administering to the subject a composition comprising isookanin or a salt thereof as an active ingredient,
wherein the skin inflammatory disease is at least one selected from the group A consisting of atopic dermatitis, psoriasis, hot flushes, rosacea, erythema, and sunburn.

* * * * *